Dec. 8, 1942.   T. L. THURLOW   2,304,129
MULTIPLE BUBBLE SEXTANT OR OTHER ALTITUDE MEASURING DEVICE
Filed Oct. 15, 1941

INVENTOR
THOMAS L. THURLOW
BY
ATTORNEYS

Patented Dec. 8, 1942

2,304,129

UNITED STATES PATENT OFFICE 2,304,129

MULTIPLE BUBBLE SEXTANT OR OTHER ALTITUDE MEASURING DEVICE

Thomas L. Thurlow, Dayton, Ohio

Application October 15, 1941, Serial No. 415,069

6 Claims. (Cl. 33—70)

(Granted under the act of March 3, 1883, as amended April 30, 1928; 370 O. G. 757)

The invention described herein may be manufactured and used by or for Government for governmental purposes, without the payment to me of any royalty thereon.

This invention relates to improvements in optical instruments such as sextants, quadrants, octants and similar devices for measuring altitude and employing a bubble or other gravity controlled means such as a pendulum as a horizon reference means.

Sextants and other instruments of a similar character have long employed levels of the bubble type to serve as a horizontal reference means in place of the natural horizon and in a few instruments pendulums have been similarly employed, and are generally known in the art as gravity controlled artificial horizons. The use of a gravity controlled artificial horizon on a sextant or similar instrument in navigating an aircraft, has, however, certain disadvantages which are due to accelerations and pitching of the aircraft, i. e., under such conditions, the artificial horizon such as the bubble or pendulum is affected by the motion of the aircraft and no longer defines a reference axis perpendicular to the true vertical. The effects of linear accelerations can in general be minimized by careful piloting but the effects of small oscillations in pitch and roll are beyond the control of the pilot though the oscillations in roll are usualy of a less troublesome nature, and if the gravity controlled artificial horizon is only lightly damped so as to respond almost instantly whenever the instrument is tipped out of the vertical, the image thereof will oscillate or dance so that it is very difficult to estimate the mid-point of its swing and also if the gravity controlled means is heavily damped the sluggish response thereof will create a greater error in attempting to attain an equal shift of the image of the celestial body on each side of the apparent mean position of the image of the artificial horizon. The above acceleration effects are the same even if the sextant is of the type disclosed in United States Patent No. 1,392,263 in which the images of the celestial body and artificial horizon move in the same direction so that if in coincidence at any point in the field of view they will remain in coincidence except for the effects of acceleration.

The applicant has found, however, that if in place of the single bubble ordinarily employed as an artificial horizon, two or more bubbles or other gravity controlled means are employed movable in planes parallel with the line of sight and having different degrees of damping it is possible by simultaneously observing the images of the bubbles or other means, to determine the mean position of the oscillation thereof much more accurately than with a single bubble. This phenomena is not based on any mathematical relationship between the rates of response of the bubbles or other reference means but appears to reside in the fact that if two of the bubbles are more highly damped than the sensitive bubble, the amplitude of oscillation of the damped bubbles will be much less and serve to confine the possible mean point of oscillation thereof to a smaller range which when compared with the oscillation of the sensitive bubble enables the determination of the midpoint of the oscillation of the latter and of the bubble system as a whole to be more accurately determined. The location of the mean point of oscillation of the bubble system is determined without any reference to whether or not the bubbles ever become aligned at the mid-point of the oscillation thereof and hence there need be no definte mathematical relation between the frequency of oscillation or rate of response of the respective bubbles. In an instrument of the character described the principle of the invention may be applied to pendulums if the same are employed for use as artificial horizons by constructing the pendulums to have different frequencies or different degrees of damping.

The principal object of the invention is the provision in an altitude measuring instrument such as a sextant or the like, of a gravity controlled artificial horizon means including a plurality of liquid level bubbles or pendulums each having a different frequency or period or rate of response to oscillatory acceleration forces, and the said plurality of bubbles or pendulums serving as a common horizontal reference means.

Other objects of the invention will appear by reference to the detailed description hereinafter given and to the appended drawing in which.

Figure 1:
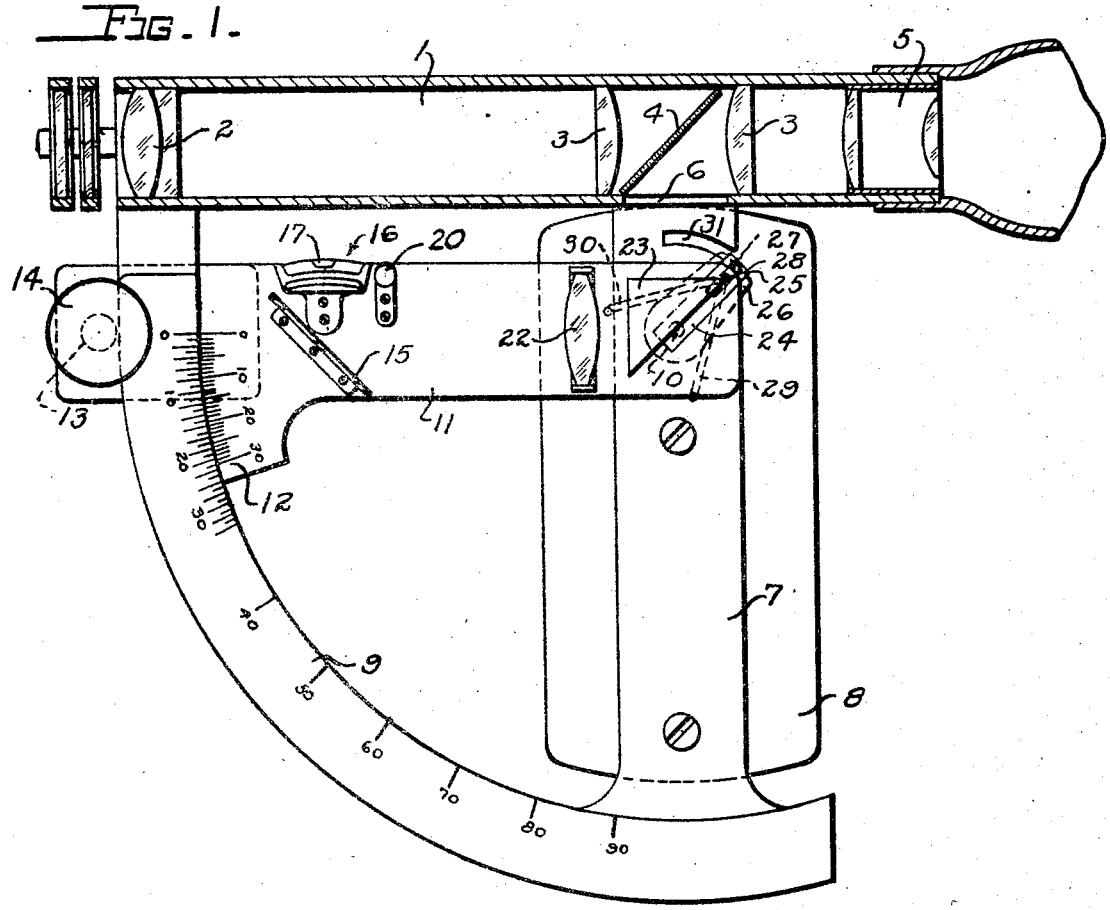
Fig. 1 is a side elevation view partly in section illustrating the invention as applied to a direct pointing type of sextant of a well known construction.
Figure 2:
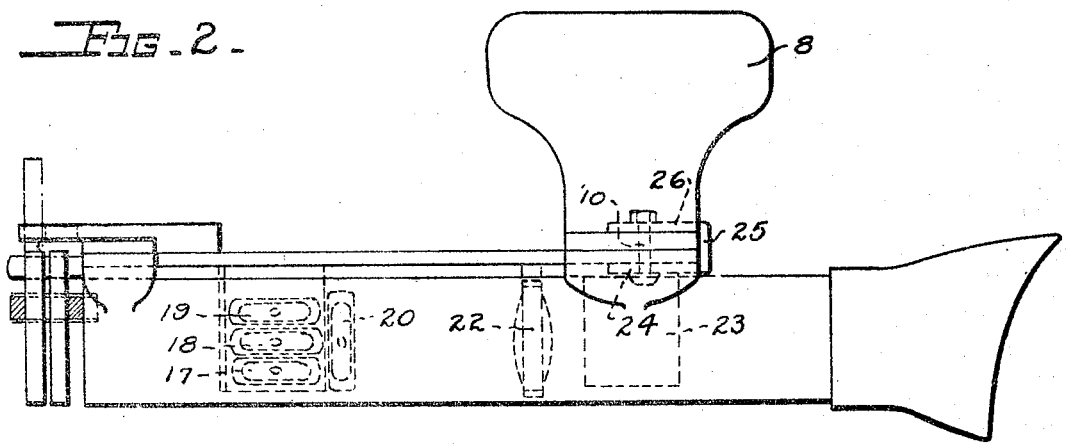
Fig. 2 is a top plan view of the device illustrated in Fig. 1.

Referring now to Figs. 1 and 2, the reference numeral 1, generally, indicates a conventional telescope adapted to be pointed directly at the celestial body or other object to be observed and is provided with an objective lens 2, spaced image erecting lenses 3, an inclined clear glass mirror 4 mounted between the lenses 3, and a conventional eyepiece or occular 5 located at the end of the telescope. The telescope 1 is provided with an aperture 6 through which the image of the artificial horizon is projected onto the mirror 4. The telescope is rigidly secured to a plate member 7, to which is secured a handle 8, and an arcuate scale 9, the latter being secured at its upper end to the telescope 1.

A pivot 10 extending at right angles from the plate 7 serves to pivotally mount an arm 11 at its inner end, the arm adjacent its outer end being provided with a vernier scale 12 which is adapted to co-operate with the indicia engraved on scale 9. The arm 11 at its outer end is provided with a friction roller 13 which engages the periphery of the arcuate scale 9 and is rotated by a knurled wheel 14 so as to rotate the arm 11 about its pivot to any desired position within limits of ninety degrees of movement.

On the arm 11 intermediate its ends is mounted an inclined silvered reflector 15 immediately over which is mounted a bubble assembly constituting a gravity controlled artificial horizon and generally indicated by the reference numeral 16 and including three level bubble tubes 17, 18 and 19 respectively, and the liquids in the respective bubble tubes differing in viscosity so that the bubble in tube 17 is only slightly damped and is a so-called "fast" bubble while the bubbles in level tubes 18 and 19 are respectively increasingly damped. A third bubble tube 20 is arranged transversely of the bubble tubes 17, 18 and 19 and is employed to indicate lateral tilt and is per se well known in the art. For taking sights at night a lamp (not shown) for illuminating the bubbles from the side may be provided.

The images of the bubbles 17 to 20 inclusive are reflected by mirror 15 through a collimating lens 22 onto a reflecting glass prism 23 which reflects the images of the bubbles onto the clear glass reflecting mirror 4 of the telescope 1, the images then being visible through the eyepiece 5.

The prism 23 is mounted on a support 24 which is provided with a bent over portion 25 which is formed integral with the outer end of a lever 26 which is pivotally mounted on the pivot 10 behind the arm 11. The lever 26 is provided with a radial slot 27 into which is fitted a guide pin or crosshead 28 which is rigidly secured to the outer end of a link 29 and serving as a pivot for the outer end of a similar link 30. The links 29 and 30 are respectively pivotally connected at their outer ends to the plate member 7 and the arm 11 and a slot 31 is provided in the member 7 to provide for arcuate movement for the bent over portion 25 of the prism support 24. As the arm 11 is rotated relative to the plate member 7, the pin 28 and links 29 and 30 act in a manner equivalent to a compass straightening device so that the centerline of lever 26 always bisects the included angle between arm 11 and plate member 7, and prism 23 is thus rotated through one-half of the angle of rotation of arm 11 relative to scale 9.

In the sextant as illustrated in the drawing the radius of curvature of the bubble tubes and the focal length of the optical system for transmitting the bubble images is made equal to the equivalent focal length of the lens system of the telescope, so that except for the effects of accelerations, the images of the celestial body and the artificial horizon reference means move in the same direction an equal amount and when brought in coincidence will thereafter remain in coincidence. With this construction the response of the bubbles is controlled by using liquids having the requisite viscosity in the respective level tubes, but it is to be understood that the bubble characteristics may be similarly varied by altering the radius of curvature of the bubble tubes in that class of instruments in which the images must be made to coincide with a reference such as a cross hair placed in the field of view and in this class of instrument the bubble characteristics may be controlled by selection of the radius of curvature of the level tube or of the viscosity of the liquid employed in the level tubes, or by a combination of both.

*Operation*

In using the sextant in accordance with the invention the telescope 1 is pointed directly toward the celestial body to be observed and the arm 11 rotated by operation of thumb-wheel 14 until the image of the celestial body and the imaginary transverse line passing through the bubble images coincide, the elevation angle then being read on scale 9. If, however, the sextant is being shifted out of the vertical by acceleration forces such as arise due to pitching of an aircraft, the image of the celestial body will appear to oscillate and the images of the bubbles in level tubes 17, 18 and 19 will also appear to oscillate, each with a different amplitude and out of phase in varying degrees with the moving image of the celestial body. Since it is impossible under the above conditions due to lag to bring the image of the celestial body into coincidence even with the image of the fast bubble 17, so that it becomes necessary to estimate the means position of the oscillation of the bubble system which is rendered more accurate by comparison of the motion of the three bubbles 17, 18 and 19 as noted above, and the arm 11 is adjusted until the image of the celestial body appears to oscillate equally on either side of the apparent mean oscillation point of the bubble system and the angular position of the arm 11 relative to the scale 9 is taken as a measure of the altitude of the celestial body. The bubble in level tube 20 is employed in a well known manner to indicate lateral tilt of the sextant. A number of separate altitude determinations are made and averaged to obtain the actual altitude of the celestial body and it has been found that the average reading obtained with a sextant employing a multiple bubble artificial horizontal is considerably more accurate under conditions of acceleration than readings on an instrument employing only a single bubble.

It is apparent that the principle of the invention may be applied to altitude measuring instruments employing pendulums or equivalent gravity controlled means and the invention is applicable to any sextant to replace the single bubble or other gravity controlled artificial horizon.

Though one form of the invention has been illustrated and described, various modifications thereof will be apparent to those skilled in the art as falling within the scope of the invention as defined by the appended claims.

I claim:

1. In an instrument for measuring the altitude of a celestial or other body with respect to a horizontal reference plane, gravity controlled means for establishing said reference plane, and rotatable means for bringing the image of said body into coincidence with the image of said gravity controlled means, said gravity controlled means comprising a plurality of gravity controlled elements movable in parallel planes and each having a different rate of response to the tilting of said instrument out of the vertical.

2. The structure as claimed in claim 1, in which the gravity controlled means comprises a plurality of liquid level bubble tubes arranged in parallel, each of said bubbles having a different degree of damping and the images of which are simultaneously visible to serve as a horizon reference.

3. The structure as claimed in claim 1, in which the gravity controlled means comprises a plurality of liquid level bubble tubes arranged in parallel, the liquids in said bubble tubes respectively differing in viscosity.

4. An artificial horizon attachment for sextants and the like comprising a plurality of liquid level bubble tubes arranged so that the respective bubbles move in planes parallel to the axis of sighting, each of said bubble tubes having the same radius of curvature and the liquids therein respectively differing in viscosity.

5. An artificial horizon attachment for sextants and the like comprising a plurality of liquid level bubble tubes arranged so that the respective bubbles move in planes parallel to the axis of sighting, each of said bubble tubes being so constructed that the bubbles have a respectively different rate of response to tilting of said level tubes out of the vertical.

6. For use in a sextant or equivalent instrument for measuring the altitude of a celestial body and having a liquid level artificial horizon corelated to the focal length of the optical system of the sextant such that the images of the celestial body and artificial horizontal shift in the same direction and with equal magnitude except for the effects of accelerations; the improvement which consists of constructing the artificial horizontal means of a plurality of liquid level tubes arranged in parallel relation, each of said level tubes having the same radius of curvature and the bubbles in said tubes being simultaneously visible, the liquids in said level tubes respectively differing in viscosity such that the rate of response of the bubbles in said tubes respectively differ from each other.

THOMAS L. THURLOW.